No. 785,458. PATENTED MAR. 21, 1905.
P. G. WATMOUGH, Jr.
PHASE INDICATOR.
APPLICATION FILED NOV. 17, 1900.

Witnesses:
Lewis P. Abell.
Benjamin B. Hull.

Inventor.
Pendleton G. Watmough, Jr.
by Albert G. Davis
Atty.

No. 785,458.                                             Patented March 21, 1905.

UNITED STATES PATENT OFFICE.

PENDLETON G. WATMOUGH, JR., OF SCHENECTADY, NEW YORK, ASSIGNOR TO GENERAL ELECTRIC COMPANY, A CORPORATION OF NEW YORK.

PHASE-INDICATOR.

SPECIFICATION forming part of Letters Patent No. 785,458, dated March 21, 1905.

Application filed November 17, 1900. Serial No. 36,815.

*To all whom it may concern:*

Be it known that I, PENDLETON G. WATMOUGH, Jr., a citizen of the United States, residing at Schenectady, county of Schenectady, State of New York, have invented certain new and useful Improvements in Phase-Indicators, of which the following is a specification.

My invention consists of a novel form of phase-indicator of particular value for use in connection with multiphase circuits for showing the phase difference between current and electromotive force. The instrument itself comprises two relatively rotatable members, the windings of one of the members being connected in series with the polyphase mains, while the windings of the other member are connected in shunt. The connections are so made that the windings of each member when traversed by current set up a rotary magnetic field, the direction of rotation of the fields being the same. The movable member of the indicator assumes a position such that the polar line of the magnetic field due thereto is brought into coincidence with the polar line of the magnetic field due to the stationary member of the instrument. Since the two magnetic fields revolve at the same speed, the two members of the instrument remain in fixed relation to each other so long as there is no change in the phase relation between the currents in the two members. As soon, however, as the current in the polyphase mains begins to lag or lead the field due thereto shifts backward or forward to correspond, thereby causing the movable member of the indicator within the influence of this field to shift correspondingly. The angle of displacement of this movable member thus furnishes a measure of the phase displacement between the current and electromotive force of the polyphase circuit.

The nature of my invention will be better understood by reference to the following description, taken in connection with the accompanying drawings.

The points of novelty I will set forth in claims appended hereto.

Figure 1:
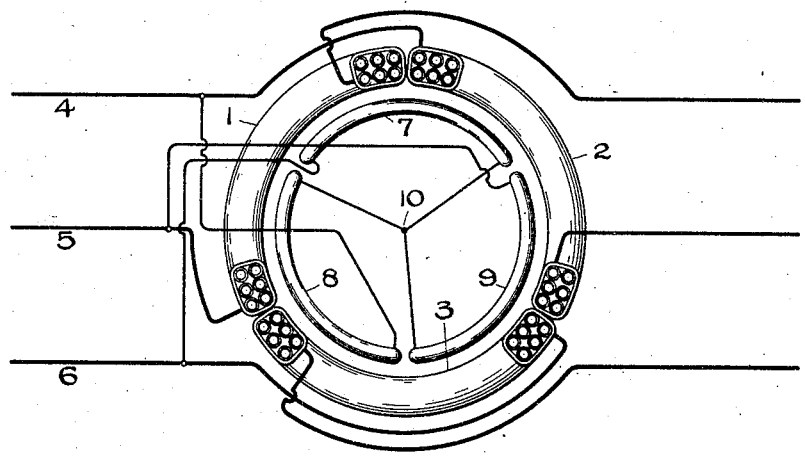
Figure 2:
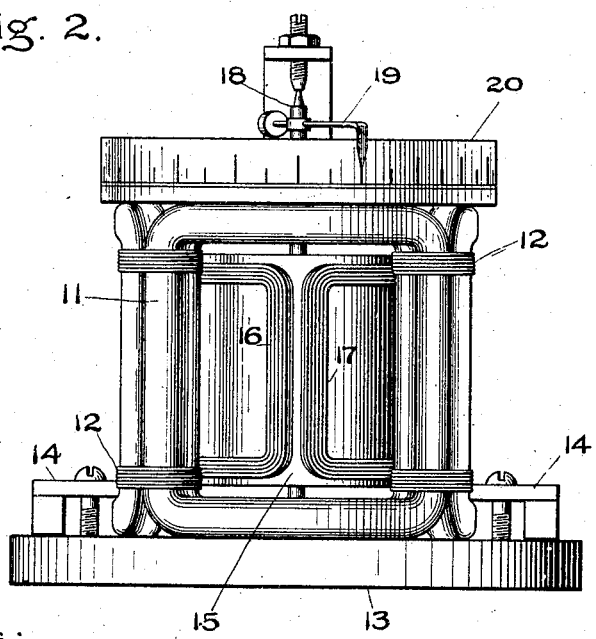

Figure 1 is a diagram representing an arrangement of circuits suitable for carrying out my invention, while Fig. 2 is a view of an instrument built in accordance with the principles above set forth and embodying the connections represented in Fig. 1.

The phase-indicator, as above described, comprises two relatively rotatable members, one of which is constructed and proportioned so as to carry the total current traversing the polyphase mains, while the other is made so that it may be connected in shunt across the mains. The series windings being necessarily heavy, so as to have sufficient current-carrying capacity, preferably constitute the fixed member of the phase-indicator, the movable member being arranged to carry the light potential-windings in shunt across the mains. In Fig. 1 the windings 1, 2, and 3, shown partly in cross-section, are arranged in three-phase relation to each other, as indicated, and are connected, respectively, in series with the three-phase mains 4, 5, and 6, in connection with which the phase-indicator is to be used.

The movable member of the indicator consists of a suitably-pivoted support carrying the three potential-coils 7, 8, and 9, connected in Y connection to each other with their free terminals joined, respectively, to the three-phase mains 4, 5, and 6. Instead of having one terminal of each of the potential-coils connected to the common point 10, so as to form a Y connection between the coils, it is of course evident that the connections may be so made as to include the coils in delta relation to each other.

Fig. 2 represents an instrument built in accordance with the diagram in Fig. 1. The coil 3 in Fig. 1 is in Fig. 2 indicated at 11, the remaining coils 1 and 2 being in Fig. 2 nearly concealed from view. The coil 11 and its companion coils are secured together in any suitable manner—as, for instance, by means of binding-cords 12—the whole structure being then fixed to a suitable base 13 by means of the clips 14.

Within the fixed member of the indicator is located a movable member consisting of a suitable supporting-drum 15, of non-conducting material, upon which are mounted three coils corresponding to the potential-coils indicated at 7, 8, and 9 in Fig. 1. In Fig. 2 a partial view of two of these coils is obtained through the opening in the series coil 11. These potential-coils thus partially seen are indicated at 16 and 17.

The movable member of the indicator is pivotally supported on a vertical axis, the upper end of the shaft upon which this member is mounted being shown at 18. This shaft carries a suitable pointer 19, movable over a scale 20, which for convenience may be mounted upon the fixed member of the indicator. No spring or other restoring device is used for the movable member, which is free to assume any position demanded by the relation of the rotary fields of the two members of the instrument.

The connections between the coils of the instrument being made substantially as shown in Fig. 1, the pointer will take up a position representing the angle of lag or lead between the electromotive force and current of the polyphase system. The instrument being acted upon by all of the phases of the system is obviously less affected by unbalancing of the system than is the case with phase-indicators heretofore employed.

What I claim as new, and desire to secure by Letters Patent of the United States, is—

1. In an instrument responsive to change in power factor, the combination of current or series coils adapted under the influence of current to develop a rotary magnetic field, potential-coils also adapted to develop a rotating magnetic field, and means for rotatively mounting one set of coils so as to be movable without restraint within the influence of the other set of coils.

2. In an alternating-current instrument, the combination of two members mounted so as to be movable relatively to each other without mechanical restraint, means for developing a rotary field in one member, means for developing in the other member a rotary field having the same direction of rotation as that of the first member, and means for noting the relative movements of said members caused by relative shifting of said fields.

3. An indicator for alternating-current circuits comprising two members movable without restraint relatively to each other, both of which are provided with windings, the windings on one of the members being adapted to be put in circuit with the alternating-current mains and to develop a rotary magnetic field while the windings of the other member are adapted for connection across said mains, and means for indicating angular displacement between said members.

4. A phase-indicator comprising members movable relatively to each other without restraint, means for setting up in said members rotary fields due to currents of the same frequency, said fields having the same direction of rotation, and means for indicating relative displacement of said members.

5. A phase-indicator comprising a set of series coils and a set of potential-coils, each set being mounted so as to be capable of relative motion without restraint, connections between the coils such that current passed through them will act to produce a rotary magnetic field corresponding to each set of coils, and means for indicating relative displacement between the sets of coils.

6. In a phase-indicating instrument the combination of a member provided with means for generating a field depending on current, with a member provided with means for generating a field depending on potential, said members being free to move with reference to each other and to set themselves without restraint at the proper angle.

In witness whereof I have hereunto set my hand this 14th day of November, 1900.

PENDLETON G. WATMOUGH, Jr.

Witnesses:
 BENJAMIN B. HULL,
 MARGARET E. WOOLLEY.